No. 752,719. PATENTED FEB. 23, 1904.
H. B. SNELL.
AUTOMATIC SIGNALING SYSTEM FOR ELECTRIC RAILWAYS.
APPLICATION FILED JULY 17, 1903.
NO MODEL. 3 SHEETS—SHEET 1.
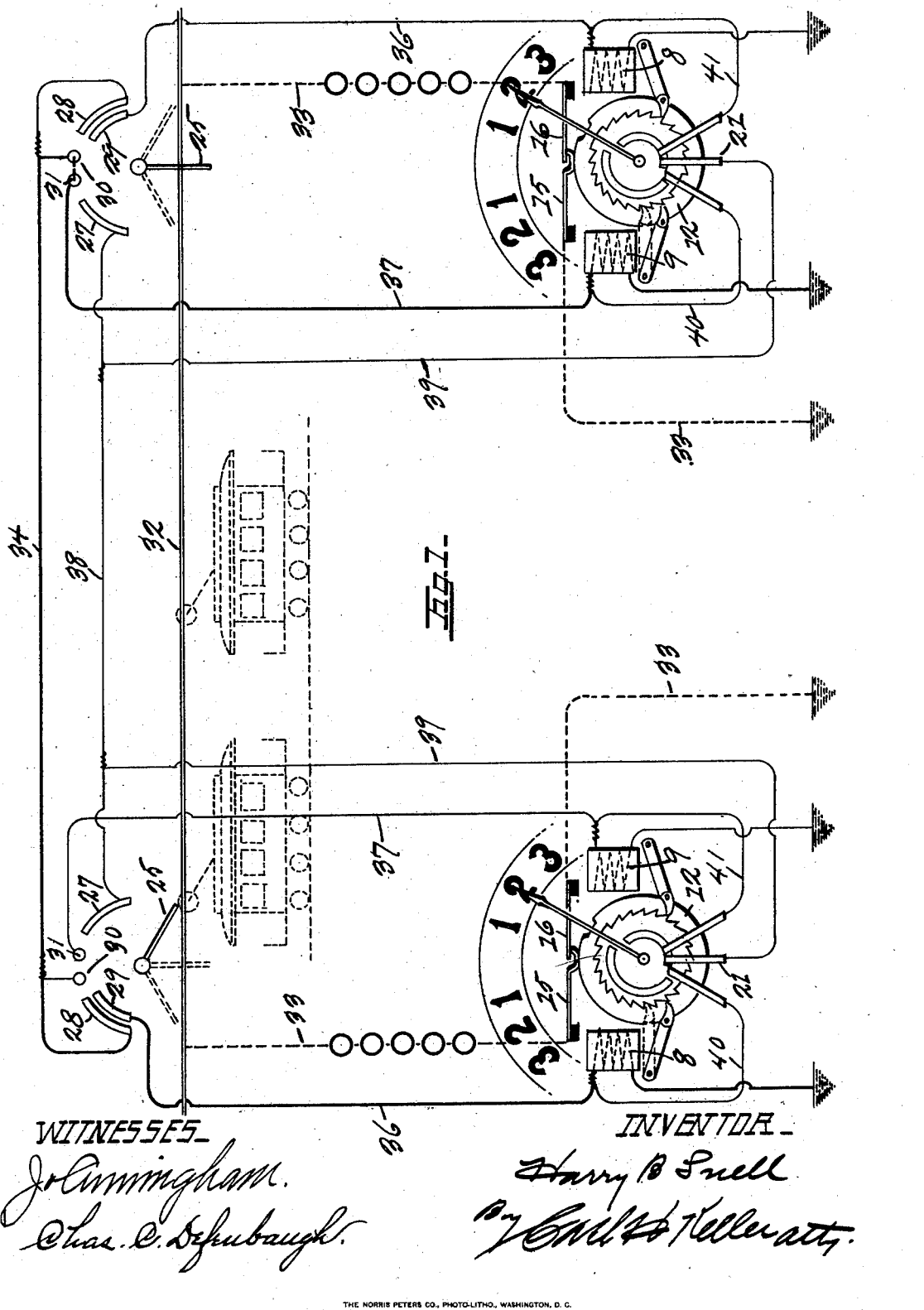

No. 752,719. PATENTED FEB. 23, 1904.
H. B. SNELL.
AUTOMATIC SIGNALING SYSTEM FOR ELECTRIC RAILWAYS.
APPLICATION FILED JULY 17, 1903.
NO MODEL. 3 SHEETS—SHEET 2.
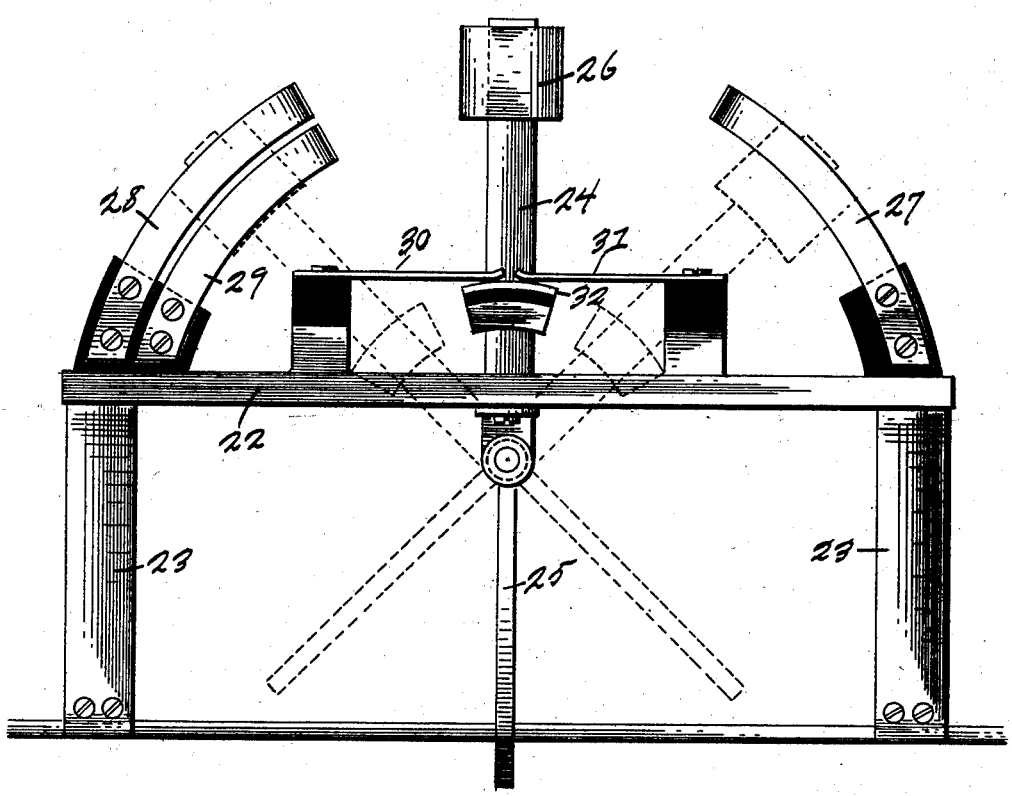
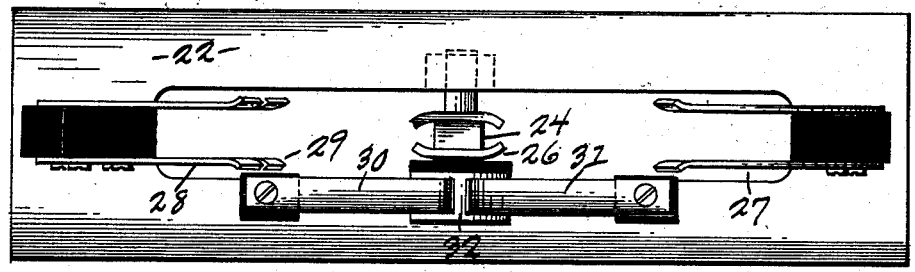

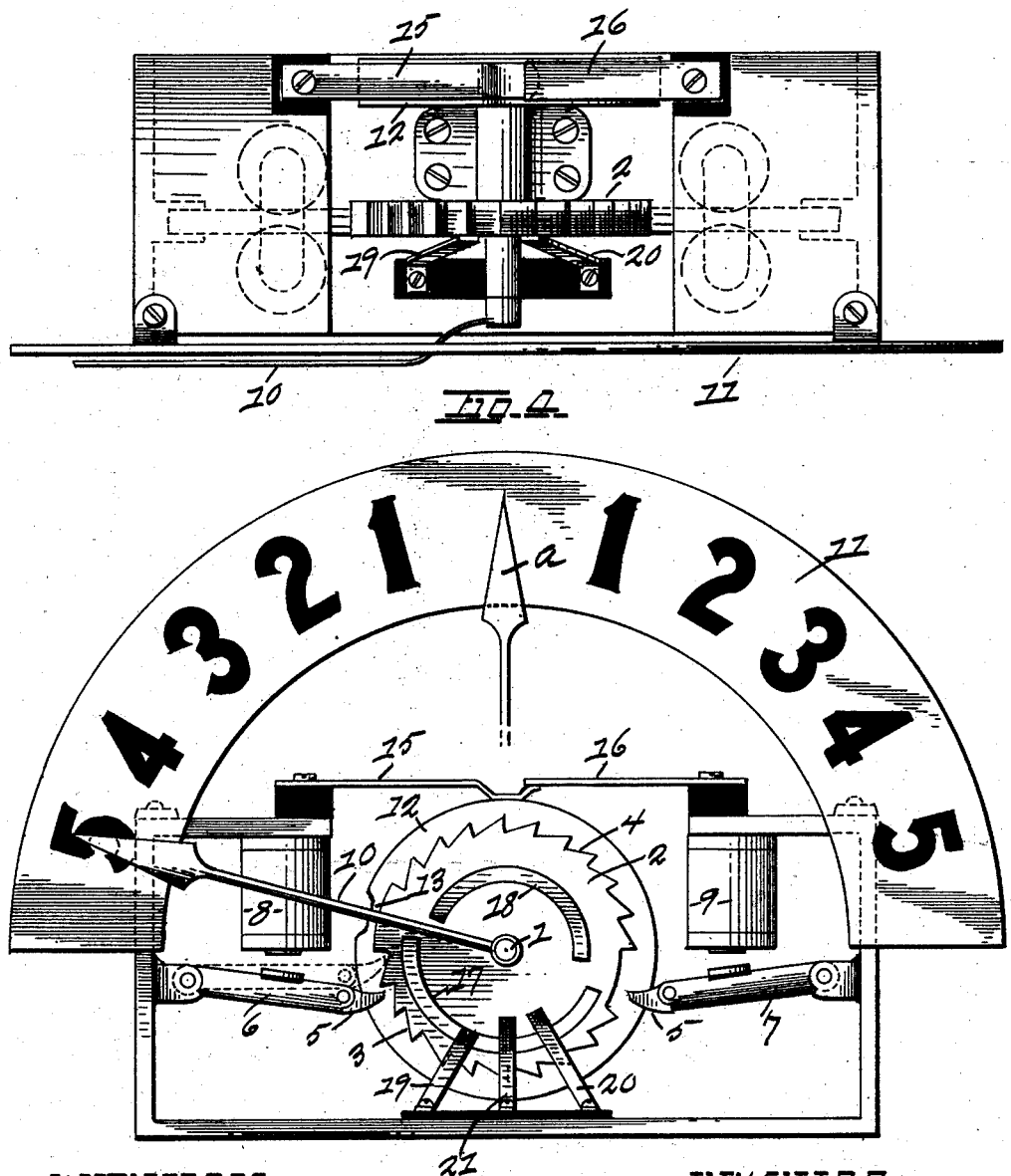

No. 752,719.　　　　　　　　　　　　　　　　　　　　Patented February 23, 1904.

UNITED STATES PATENT OFFICE.

HARRY B. SNELL, OF CEMENT CITY, MICHIGAN, ASSIGNOR, BY DIRECT AND MESNE ASSIGNMENTS, TO THE SNELL ELECTRIC SIGNAL COMPANY, A CORPORATION OF MICHIGAN.

AUTOMATIC SIGNALING SYSTEM FOR ELECTRIC RAILWAYS.

SPECIFICATION forming part of Letters Patent No. 752,719, dated February 23, 1904.

Application filed July 17, 1903. Serial No. 165,964. (No model.)

*To all whom it may concern:*

Be it known that I, HARRY B. SNELL, of Cement City, county of Lenawee, and State of Michigan, have invented certain new and useful Improvements in Automatic Signaling Systems for Electric Railways; and I do hereby declare that the following is a full, clear, and exact description of the invention, which will enable others skilled in the art to which it appertains to make and use the same, reference being had to the accompanying drawings, and to the characters of reference marked thereon, which form part of this specification.

My invention has reference to an automatic signaling system for electric railways. I have made former application for Letters Patent of the United States, Serial No. 154,194, for a system of a similar character, in which the entrance of a car or cars upon a block or section of track between two turnouts is indicated by means of a suitable signal provided at the opposite end of the block, a warning-signal being thereby given to a car approaching from the opposite direction.

In the system herein described and which forms the subject of my present application I provide a signal, preferably an illuminated signal, at both ends of the block to indicate the presence of a car or cars thereon, and also mechanical indicating means operated simultaneously at both ends of the block to indicate the direction in which the cars are running, as well as the number of cars upon the block.

In the fulfilment of my invention I employ the novel arrangement of circuits and simple and effective mechanism operating therewith, the same being fully pointed out in the following specification, taken with the accompanying drawings, in which—

Figure 1 is a diagrammatic view illustrating my system as applied to a single block, showing the operation of the various circuits in connection with the signal mechanism and the trolley-actuated switches at the ends of the block. Fig. 2 is an elevation of a trolley-switch adapted for employment in the operation of my invention. Fig. 3 is a plan view of the switch. Fig. 4 is an elevation of one of the indicating mechanisms arranged at each end of the block, and Fig. 5 is a plan view of the same.

At each end of a block is provided a mechanism adapted to indicate the direction in which the cars are running and also the number of cars upon the block. This mechanism comprises a rotatable shaft 1, carrying a ratchet-wheel 2, arranged with oppositely-disposed ratchet-teeth 3 and 4, respectively adapted to be engaged by gravity-operating pawls 5 upon the ends of pivoted arms 6 and 7, actuated by magnets 8 and 9, respectively arranged on opposite sides of the ratchet-wheel. It will be apparent that repeated closing of the circuit through one of the magnets will cause the intermittent rotation of the ratchet-wheel in one direction and that if thereafter the circuit through the other magnet is closed repeatedly an equal number of times the ratchet-wheel will rotate in a reverse direction and resume its original position. Furthermore, the ratchet-teeth being equally spaced, the extent of the movement at each actuation will be the same.

10 is an indicator hand or pointer carried by the shaft 1 and adapted to indicate the extent of the movement of the ratchet-wheel 2 in either direction upon a dial 11, provided on its face with a series of numerals "1," "2," "3," "4," &c., arranged on each side of a vertical plane through the axis of rotation of the shaft 1, the numerals being equally spaced to indicate the successive movements of the ratchet-wheel. In illustrating the indicating mechanism I have shown in the drawings a single ratchet-wheel having oppositely-disposed teeth on its periphery; but it is apparent that this arrangement may be substituted by the employment of two separate ratchet-wheels secured on the same shaft side by side, with their teeth arranged in opposite directions. Upon the shaft 1, which carries the ratchet-wheel, is also secured a disk 12, having a marginal recess 13, and 15 and 16 are metallic contact-fingers mounted upon blocks of insulation, the end of the finger 15 being adapted to ride upon the periphery of the disk 12. When the indicator-hand points in a vertical direction, as shown at a, Fig. 4, the end of the finger 15 will spring into the recess 13, and the circuit through the fingers 15 and 16 will be broken.

17 and 18, respectively, are metal segments secured upon the face of the ratchet-wheel, being insulated therefrom and from each other, and 19 and 20 are spring-contacts adapted to press upon and make connection with the segments 17 and 18, respectively. 21 is a similar spring-contact adapted to press upon both the segments 17 and 18, the arrangement of the segments being such that when the finger 21 contacts with the segment 18 its connection with the segment 17 will be broken, and vice versa. When the indicator-hand points in a vertical direction, the spring-contact 21 will take a position between the segments 17 and 18 and be insulated from both, the ratchet-wheel being faced with fiber or other insulating material, upon which the segments are mounted.

The trolley-actuated switch which I employ in carrying out my invention is shown in Figs. 2 and 3. The same comprises a base-plate 22, arranged at the ends with suitable clamps 23, adapted for mounting the switch upon a trolley-wire, and centrally of the plate is pivoted a contact-arm 24 at its lower end, with a bifurcated plate 25, adapted to take a position on each side of the trolley-wire so as to be engaged by the trolley-wheel as it passes beneath the same, the altered position of the contact-arm when the car is running in opposite directions being shown in dotted lines, while the normal position of the arm while the switch is inoperative is shown in full lines, Fig. 2. The contact-arm 24 may be returned to its normal position after being operated by any suitable or preferred means, it being apparent that springs may be easily arranged to effect this purpose. At the outer end of the arm 24 is provided a contact-shoe 26, adapted to contact with a single terminal 27 at one end of the switch or the double terminals 28 and 29 at the opposite end, said terminals being arranged upon blocks of insulation, the arm 24 leading the trolley-current into the terminal 27 when actuated in one direction and into the terminals 28 and 29 when actuated in the opposite direction.

30 and 31 are terminals separated from each other, being mounted upon blocks of insulation, and 32 is a contact-plate carried by the arm 24, adapted to connect the terminals 30 and 31 when the arm is in vertical position. The terminals 30 and 31 being insulated from the base of the switch and the contact-plate 32 being also insulated upon the arm 24, said terminals will be out of direct connection with the trolley-circuit.

The mechanism adapted for employment in carrying out my invention having now been described, the operation of the same will be readily understood by reference to the diagram shown in Fig. 1. The arrangement of the circuits being the same at both ends of the block, like circuits will be indicated by like numerals. The trolley-wire carrying the current-supply is indicated at 32. The local signal-circuits, containing, preferably, ordinary incandescent lamps in series, are designated by the numeral 33. Each of these circuits extends from the trolley-wire to the ground, being completed through the contacts 15 and 16, the circuit being open and the signal-lamps extinguished when the hand of the indicator points in a vertical direction, the end of the finger 15 then springing into the recess 13, provided in the periphery of the disk 12. 34 is a line-wire extending from end to end of the block and connecting with terminals 28 of the trolley-switches and also the contact-fingers 30, arranged at either end of the block. 36 represents connections leading from the terminals 29 through the magnets 8 of the indicator mechanisms to the ground, and 37 represents connections leading through the magnets 9 from the contacts 31 to the ground. 38 is a line-wire extending from end to end of the block and connecting the terminals 27, mounted upon the trolley-switches. 39 are wires at each end of the block leading to the fingers 21, adapted to connect with either of the segments 18 or 19 on the faces of the ratchet-wheels. 40 represents wires leading from the contact 19, and 41 similar connections leading from the contacts 20, adapted to complete the circuit from the wires 39 through the magnets on the right or left, respectively, depending upon the position of the ratchet-wheel and the segments 17 and 18, carried thereby.

The operation of the system is diagrammatically illustrated in Fig. 1. As a car enters the block on the left the trolley-wheel will contact with the bifurcated plate of the switch at this end and move it to the position indicated in full lines, the plate of the switch on the right remaining in vertical position. The trolley-current will now be closed into the terminals 28 and 29 and pass along the line-wire and circuits (indicated in heavy lines) and through the magnets 8 and 9 to the ground, the armatures of both magnets being actuated simultaneously and the ratchet-wheels of both indicator mechanisms rotated in a right-hand direction the distance of a single tooth, the indicator-hand pointing to the numeral "1" to the right of the vertical plane dividing the two series of numerals on the dial of each indicator mechanism, and thereby indicating at both ends of the block that a car has entered the block and also indicating the direction in which the car is running. The rotation of the ratchet-wheels will also effect the closing of the local signal-circuits and cause an illuminated signal to be displayed at both ends of the block. Should the first car be followed by another running in the same direction, the same operation is repeated, and the hands of both indicators will then advance and point to the numerals "2" of the series on the right of each indicator mechanism, as shown in Fig. 1, the illuminated signals at the ends of the block being uninterrupted. After the operation of the switch on the left by the trolley-wheel the parts of the switch will assume their normal position. (Shown in Fig. 2.) When the first car upon the block arrives at the switch on the right, the bifurcated plate at said switch will be engaged by the trolley-wheel and moved in a right-hand direction, the arm of the switch contacting with the terminal 27 and closing the current from the trolley into the line-wire 38, the current then passing down the wires 39 at both ends of the block leading to the segments upon the faces of the ratchet-wheel. The ratchet-wheels having been rotated in a right-hand direction, the current will pass along the leads 41 through the magnets on the right of each mechanism and then to the ground. The armatures of the magnets being actuated, the ratchet-wheels of both indicator mechanisms will rotate in a reverse direction the distance of a single tooth, the hand then pointing to the numeral "1," indicating at both ends of the line that there is still one car upon the block and also indicating the direction in which it is running. The passage of the remaining car from the block will cause both hands of the indicators to point in a vertical direction, (shown at *a*, Fig. 4,) indicating when in this position that the block is unoccupied. The illuminated signals at the ends of the block will also be extinguished, the signal-circuits being opened simultaneously by the rotation of the recessed disks of each mechanism. Should the cars enter the block from a right-hand direction, it is apparent that the effect upon the circuits and mechanisms connected therewith would be the same, the indicator-hand pointing to the left-hand series of numerals upon the dials of the indicators instead of the right-hand series, thereby indicating the direction in which the cars are running. Should three, four, or any number of cars pass in succession into the block, the number and direction of the cars would be indicated in the same manner, the hand of the indicator rotating intermittently to the right or left as the cars enter from the right or left and rotating intermittently in a reverse direction as the cars leave the block at the end opposite to that at which they entered.

From the foregoing it will be seen that the exact condition of the block, whether occupied or clear, the number of cars on the block, and the direction in which they are operating will be indicated at both ends of the block. The advantages of this arrangement will be apparent.

Having described my invention, what I claim, and desire to secure by Letters Patent, is—

1. In an automatic block-signaling system, indicating mechanisms located at opposite ends of a block, each provided with a dial and a rotatable shaft carrying an indicator-hand and an oppositely-toothed ratchet-wheel, a pair of pivoted armatures adapted to be actuated independently to engage the ratchet-wheel and rotate the same intermittently in either direction, magnets for actuating said armatures, a trolley-wire carrying a current-supply, a pair of line-wires extending lengthwise of the block, circuits leading therefrom through the magnets of the indicator mechanisms, and trolley-actuated switch devices at the ends of the block adapted to control said circuits to cause the mechanisms to indicate at both ends of the block the number of cars having entered thereon and the direction in which they are running, substantially as described.

2. In an automatic block-signaling system, indicating mechanisms located at opposite ends of the block, each having a dial provided on its face with two series of numbers arranged on opposite sides of a central point, and a rotatable shaft carrying an indicator-hand and an oppositely-toothed ratchet-wheel, a pair of pivoted armatures adapted to be actuated independently to engage the ratchet-wheel and rotate the same intermittently in either direction, magnets for actuating said armatures, a trolley-wire carrying a current-supply, a pair of line-wires extending lengthwise of the block, circuits leading therefrom through the magnets of the indicator mechanisms, and trolley-actuated switch devices at each end of the block adapted to control said circuits, substantially as shown and described.

3. In an automatic block-signaling system, indicating mechanisms located at opposite ends of a block, each having a dial provided on its face with two series of numbers arranged in the arc of a circle with a central space dividing them, a rotatable shaft carrying an indicator-hand adapted to normally point to the space between the two series of numbers, an oppositely-toothed ratchet-wheel carried upon the shaft, a pair of armatures carrying pivoted pawls upon their ends to engage the ratchet-wheel and rotate the same intermittently in either direction, magnets for actuating said armatures, a trolley-wire carrying a current-supply, a pair of line-wires extending lengthwise of the block, circuits leading therefrom through the magnets, trolley-actuated switch devices mounted upon the trolley-wire at the ends of the block adapted to control said circuits, local signal-circuits containing suitable signals, and a closing device actuated by the rotatable shaft in each signal mechanism to close the local signal-circuits, said circuits being open only when the indicator-hand points to the space between the two series of numbers upon the indicator-dial, substantially as shown and described.

In testimony that I claim the foregoing as my own I affix my signature in presence of two witnesses.

HARRY B. SNELL.

Witnesses:
CARL H. KELLER,
CHAS. C. DEFENBAUGH.